United States Patent
Kaizu

(10) Patent No.: US 7,834,493 B2
(45) Date of Patent: Nov. 16, 2010

(54) ROTOR FOR VEHICLE ALTERNATOR

(75) Inventor: Hiroo Kaizu, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/318,410

(22) Filed: Dec. 29, 2008

(65) Prior Publication Data

US 2009/0184593 A1 Jul. 23, 2009

(30) Foreign Application Priority Data

Jan. 21, 2008 (JP) ............................. 2008-010320

(51) Int. Cl.
*H02K 9/00* (2006.01)
(52) U.S. Cl. ........................................ 310/62
(58) Field of Classification Search ................ 310/62, 310/63, 211; 416/211
See application file for complete search history.

(56) References Cited

U.S. PATENT DOCUMENTS

| | | | |
|---|---|---|---|
| 5,235,229 A * | 8/1993 | Tanaka et al. .................. | 310/62 |
| 6,177,632 B1 * | 1/2001 | Ashdown ..................... | 174/541 |
| 6,617,717 B2 * | 9/2003 | Okawa .......................... | 310/59 |
| 7,291,948 B2 | 11/2007 | Ishida | |
| 2006/0261688 A1 | 11/2006 | Akita et al. | |
| 2007/0255395 A1 * | 11/2007 | Pollock et al. ............... | 623/1.36 |

FOREIGN PATENT DOCUMENTS

| | | |
|---|---|---|
| JP | A-08-214517 | 8/1996 |
| JP | A-11-191948 | 7/1999 |
| JP | A-11-220845 | 8/1999 |
| JP | A-2000-245091 | 9/2000 |
| JP | B2-3876912 | 11/2006 |
| WO | WO 2006/016394 A1 | 2/2006 |

OTHER PUBLICATIONS

English-language translation of Japanese Office Action dated Feb. 23, 2010.
Notification of Reasons for Rejection in Japanese with English language translation, dated Nov. 10, 2009.

* cited by examiner

*Primary Examiner*—Nguyen N Hanh
(74) *Attorney, Agent, or Firm*—Oliff & Berridge, PLC

(57) ABSTRACT

A vehicle alternator is disclosed as having a rotor including magnetic pole pieces, each having claw-like magnetic pole fingers, a field coil wound on boss portions of the magnetic pole pieces, and cooling fans fixedly mounted on the magnetic pole pieces, respectively. Each cooling fan includes a central disc portion, a plurality of fan base portions formed on the central disc portion, and fan blades standing upright from the fan base portions in an axially outward direction, respectively. The central disc portion has an outer circumferential periphery formed with a plurality of cutout portions to be contiguous with roots of the fan base portions, respectively, and placed in areas radially inward of the fan blades, respectively. Each cutout portion is so placed to be perpendicular to the radial direction on which each claw-like magnetic pole finger is oriented.

3 Claims, 4 Drawing Sheets

ROTOR FOR VEHICLE ALTERNATOR

CROSS REFERENCE TO RELATED APPLICATIONS

This application is based on Japanese Patent Application No. 2008-10320, filed on Jan. 21, 2008, the content of which is hereby incorporated by reference.

BACKGROUND OF THE INVENTION

1. Technical Field of the Invention

The present invention relates to rotors for vehicle alternators and, more particularly, to a rotor of a vehicle alternator adapted for installation on automotive vehicles and trucks, etc.

2. Description of the Related Art

In general, a vehicle alternator rotor has cooling fans provided with fan blades on which a centrifugal force acts. When this takes place, the fan blades bear a centrifugal force, resulting from the rotation of the rotor, which acts in a radial direction to cause the fan blades to warp backward in a direction opposite to the fan blades. In a case where the fan blades are reliably joined to magnetic pole pieces (claw-shaped pole pieces) at axially outward end faces thereof, the occurrence of such warping can be suppressed with the use of a reactive force of the claw-shaped pole pieces.

In reducing fan noise, further, the fan blades have been located at circumferentially unequaled intervals (see, for instance, Patent Publication 1: Japanese Patent No. 3876912 on pages 3-5 and in FIGS. 1-3). With the fan blades located at the circumferentially irregular intervals, there is a risk of the fan blades coming into contact with parts of the claw-shaped magnetic poles. In order to allow such fan blades with low strength to have strength for withstanding the centrifugal force, an attempt has been made to employ a method of forming the fan blades in decreased sizes with an undesired result because of a drop in cooling capacity. With the technology disclosed in Patent Publication 1, the cooling fan has base portions (fan bases) provided with front and rear fixing portions that are devised to ensure the fan blades to have increased fixing strengths.

Meanwhile, with the rotor for the vehicle alternator disclosed in Patent Publication 1, an attempt has been made to devise suitable positions of the fixing portions of the fan bases. However, there is likelihood that the positions of the respective fixing portions cannot be necessarily located in positions as disclosed in Patent Publication 1 in light of restrictions on products. Further, the rotor, disclosed in Patent Publication 1, has cutout portions formed in parts of the fan bases at areas radially inward of the fan blades. When subjected to the centrifugal force, an issue arises with the fan blades caused to deform accompanied by stress acting on the cutout portions, depending on orientations or lengths of the cutout portions, resulting in a drop in strength of the cooling fan. Another issue arises with the occurrence of the fan blades having increased deformations. For a vehicle alternator of a small size rotatable at a high speed, the deformation of each fan blade needs to be reduced to be less than a gap between a stator and the rotor.

SUMMARY OF THE INVENTION

The present invention has been completed with a view to addressing the above issues and has an object to provide a vehicle alternator rotor having cooling fans having combined cooling capabilities and strength.

To achieve the above object, a first aspect of the present invention provides a vehicle alternator rotor, the rotor having an axis of rotation and comprising a pair of magnetic pole pieces, each having a plurality of claw-like magnetic pole fingers, each claw-like magnetic pole finger being oriented in a radial direction with the claw-like magnetic pole fingers of the pair of magnetic pole pieces alternately intermeshed with the claw-like magnetic pole fingers of the other pole piece of the pair of magnetic pole pieces, a field coil wound on boss portions of the magnetic pole pieces, and a pair of cooling fans fixedly mounted on the magnetic pole pieces, respectively. Each of the cooling fans including a central disc portion, a plurality of fan base portions formed on the central disc portion at circumferentially spaced intervals, and a plurality of axially outward extending fan blades standing upright from the fan base portions in an axially outward direction, respectively. The central disc portion has an outer circumferential periphery formed with a plurality of cutout portions to be contiguous with roots of the fan base portions, respectively, and placed in areas radially inward of the fan blades, respectively. Each of the cutout portions extends in a direction perpendicular to the radial direction on which each claw-like magnetic pole finger is oriented.

If the cutout portion is inclined with respect to a radial direction on which each claw-like magnetic pole finger extends, a stress concentration occurs in a direction from a stress generation point of the claw-like magnetic pole finger at an area from in close proximity to an outer circumferential end thereof to an inner circumferential end portion of each cutout portion. Because, the cutout portion is formed along a direction perpendicular to an orientation of the claw-like magnetic pole finger extending in the radial direction, the whole of the cutout portion can bear stress. This prevents stress from concentrating only at the end portion, thereby causing the cooling fan to have increased strength. In addition, no need arises for causing the cooling fan to be dimensioned in a small size for the purpose of ensuring strength, enabling the prevention of a drop in cooling capability.

With the rotor for the vehicle alternator of the present embodiment, each of the cutout portions may preferably have a root portion bent in a curved shape with a given radius and having a length of a value 2.2r or less where "r" represents a given radius of the curved shape.

Thus, in a case where only a part of the fan blade is associated with (fixed to) the claw-like magnetic pole finger, there is concern that a drop occurs in strength. Even with such a structure, setting the length of the cutout portion to be less than a given value makes it possible to suppress the occurrence of the drop in strength to decrease the deformation of the fan blade, caused by the centrifugal force, to a value below an allowable value.

With the rotor for the vehicle alternator of the present embodiment, each of the fan base portions, circumferentially contiguous with the fan blade partially associated with the claw-like magnetic pole finger, may be preferably associated with the two adjacent claw-like magnetic pole fingers. In an alternative, each of the fan base portions, circumferentially contiguous with the fan blade partially associated with the claw-like magnetic pole finger, may not be fixedly attached to the claw-like magnetic pole finger with which the fan blade is partially associated while fixedly attached to the other claw-like magnetic pole finger.

Thus, in a case where the fan base straddles the two claw-like magnetic pole fingers or in another case where the fan base straddling the two claw-like magnetic pole fingers is fixedly attached to only one of such claw-like magnetic pole fingers, there is a concern that a drop occurs in strength. Even with such structures, by devising the orientation and the length of the cutout portion, the reduction in stress can be suppressed to decrease the deformation of the fan blade, caused by the centrifugal force, to a value below the allowable value.

A second aspect of the present invention provides a vehicle alternator rotor, the rotor having an axis of rotation and comprising: a pair of magnetic pole pieces, each having a plurality of claw-like magnetic pole fingers, each claw-like magnetic pole finger being oriented in a radial direction with the claw-like magnetic pole fingers of the pair of magnetic pole pieces alternately intermeshed with the claw-like magnetic pole fingers of the other pole piece of the pair of magnetic pole pieces; a field coil wound on boss portions of the magnetic pole pieces; and a pair of cooling fans fixedly mounted on the magnetic pole pieces, respectively. Each of the cooling fans includes a central disc portion, a plurality of fan base portions formed on the central disc portion at circumferentially spaced intervals, and a plurality of axially outward extending fan blades, standing upright from the fan base portions in an axially outward direction, respectively, which have root portions curved from the fan base portions, respectively, each with a given radius. The central disc portion has an outer circumferential periphery formed with a plurality of cutout portions to be contiguous with roots of the fan base portions, respectively, and placed in areas radially inward of the fan blades, respectively. Each of the cutout portions extends in a direction perpendicular to the radial direction, on which each claw-like magnetic pole finger is oriented, and has a length of a value 2.2r or less where "r" represents the given radius.

DETAILED DESCRIPTION OF PREFERRED EMBODIMENTS

Now, a vehicle alternator rotor of one embodiment according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, it is to be understood that such terms as "front", "rear", "axial", "radial", "outward", "rightward", "leftward", "forward", "circumferential", "distal", "end" and the like are words of convenience and are not to be construed as limiting terms.

Hereunder, the vehicle alternator rotor of the present embodiment according to the present invention will be described below in detail with reference to the accompanying drawings.

Figure 1:
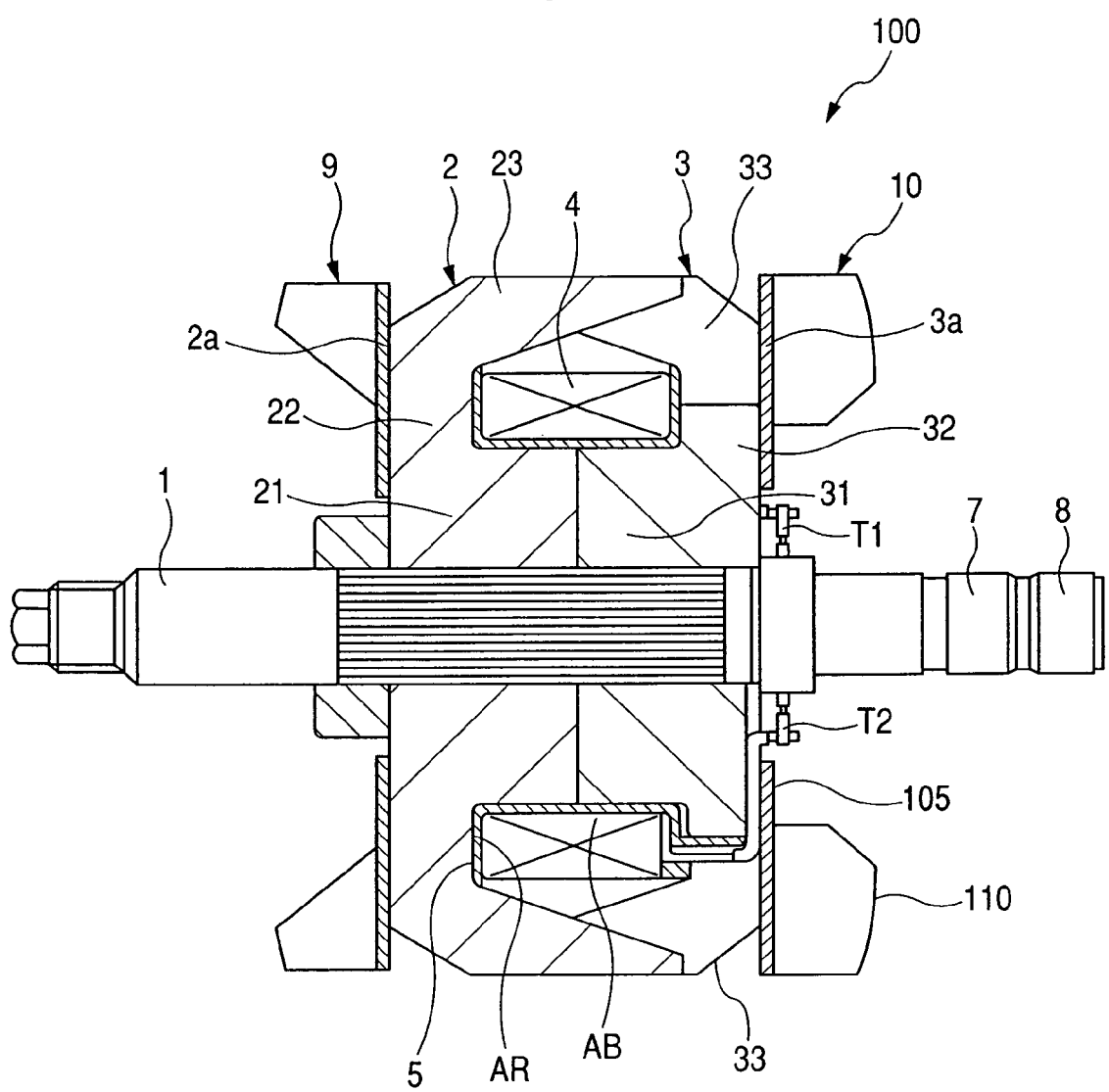
FIG. 1 is a cross sectional view of a rotor of a vehicle alternator of an embodiment according to the present invention.

FIG. 1 is a cross sectional view of the vehicle alternator rotor of the present embodiment.

With the present embodiment shown in FIG. 1, the vehicle alternator rotor 100 is rotatably supported with frames of a vehicle alternator (not shown) to be rotatably driven with an engine (not shown) installed on a vehicle. The rotor 100 includes a rotary shaft 1, front and rear Lundell magnetic pole pieces 2 and 3 fixedly mounted on the rotary shaft 1 in an axially contact with each other, and front and rear cooling fans 9 and 10 fixedly mounted on the front and rear magnetic pole pieces 2 and 3 on axially outward facing end faces 2a and 3a thereof, respectively.

The front and rear pole cores 2 and 3 have generally cylindrical boss portions 21 and 31 axially placed adjacent to each other and unitarily rotatable with the rotary shaft 1, disc portions 22 and 32 integrally formed with the cylindrical boss portions 21 and 31 on radially outward ends thereof and having the axially outward facing end faces 2a and 3a carrying thereon the front and rear cooling fans 9 and 10, and front and rear claw-like magnetic pole fingers 23 and 33, integrally formed with the disc portions 22 and 32 so as to axially extend.

The front and rear pole cores 2 and 3 are assembled to each other on the rotary shaft 1 with the front and rear claw-like magnetic pole fingers 23 and 33 being alternately intermeshed with the claw-like magnetic pole fingers of the other pole piece of the pair of magnetic pole pieces. Further, the disc portions 22 and 32 of the front and rear pole cores 2 and 3 have outer circumferential peripheries formed with annular recesses AR that are surrounded with the claw-like magnetic pole fingers 23 and 33. The annular recesses AR accommodate therein an annular bobbin AB on which a field coil 4 is wound. The field coil 4 remains in electromagnetic communication with the front and rear pole pieces 2 and 3 to magnetize the front and rear pole fingers 23 and 33 when energized. To this end, the field coil 4 has front and rear terminal ends electrically connected to front and rear terminals T1 and T2 electrically connected to front and rear slip rings 7 and 8, respectively, to receive a field current therethrough. This magnetizes the front and rear pole pieces 2 and 3 in an N-pole and an S-pole, respectively.

Next, detailed description is made of how the cooling fan is mounted on the rotor 100 with reference to the rear cooling fan 10 fixedly mounted on the axially outward end face 3a of the rear pole piece 3 placed on a rear side.

Figure 2:
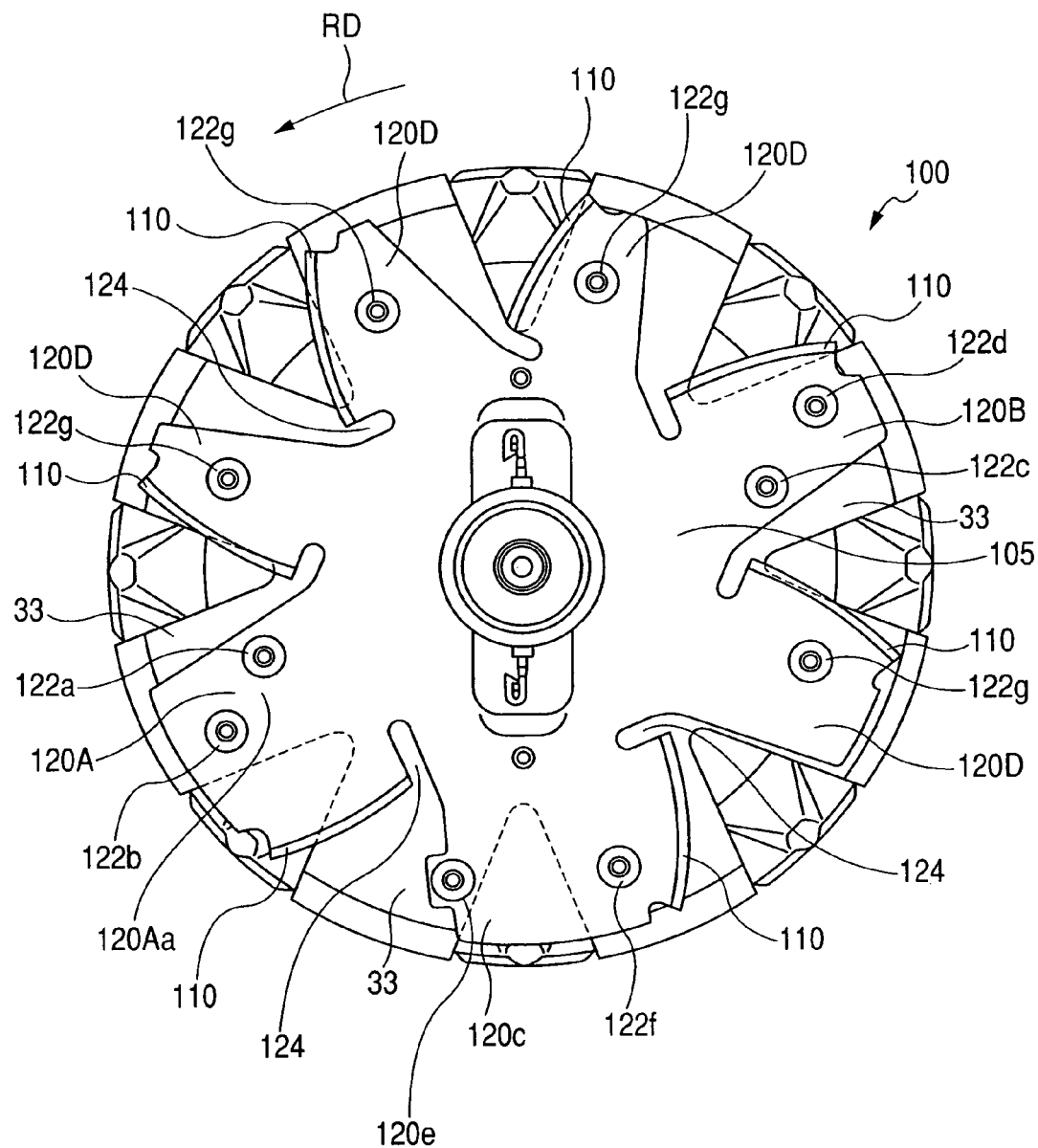
FIG. 2 is a plan view showing a detailed structure of a rear cooling fan mounted on the rotor shown in FIG. 1.

FIG. 2 is a typical view showing a detailed structure of the rear cooling fan 10 as viewed from a side closer to the slip rings 7 and 8.

As shown in FIG. 2, the cooling fan 10 has a central disc portion 105, a plurality of radially extending fan base portions (base portions) 120 radially extending from an outer circumferential periphery of the central disc portion 105 at circumferentially spaced intervals, and a plurality of axially outward extending fan blades 110 formed on circumferential edges of the radially extending fan base portions 120 at circumferential unequalled intervals (pitches) so as to axially stand upright from the circumferential edges of the radially extending fan base portions 120A-120D on a side facing a rotating direction RD of the rotor 100. Each of the fan blades 110 has a curved profile curved in shape along a direction opposite to the rotating direction RD of the rotor 100 toward an outer diametric periphery of the rotor 100.

Figure 3:
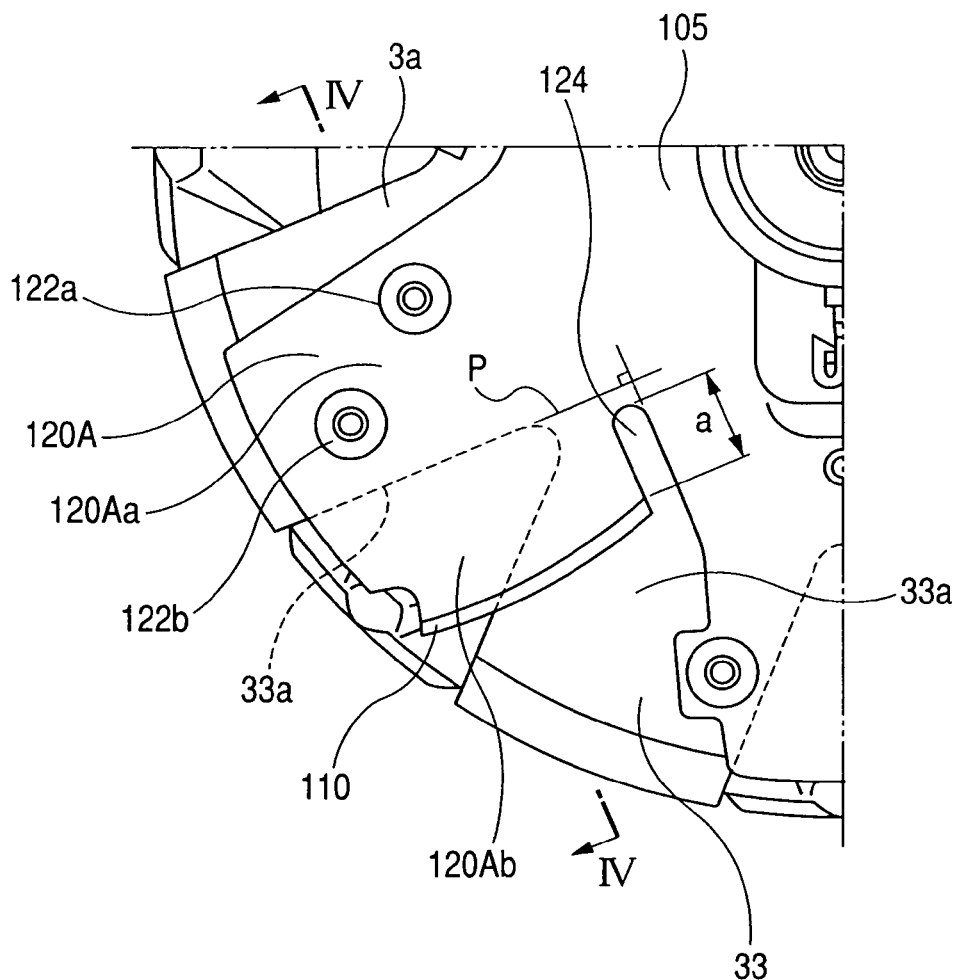
FIG. 3 is an enlarged fragmentary view showing the cooling fan shown in FIG. 2.

With the rotor 100 caused to rotate unitarily with the rotor 100, the cooling fan 10 rotates generates a cooling wind for cooling heat generating portions (such as, for instance, a rectifier and windings of a stator coil (not shown)). The radially extending fan base portions 120A-120D are fixedly secured to the axially outward end face 3a of the rear pole piece 3 by welding at ten welded portions 122a-122e. As shown in FIG. 3, the fan blade portions 120A and 120B have two welded portions 122a-122b and 122c and 122d, which are fixedly connected to the pole fingers 33 of the rear pole piece 3, respectively. The fan base portions 120A and 120B axially overlap (straddle) two adjacent pole fingers 33 of the rear pole piece 3. The fan base portion 120C also overlaps or straddles two adjacent pole fingers 33 of the rear pole piece 3 and has the two welded portions 120e and 120f, which are fixedly connected to the two adjacent pole fingers 33, respectively. The remaining fan base portions 120D have welding positions 122g each fixedly connected to each pole finger 33 at a single connecting position. In addition, a plurality of tangentially extending recess-like cutout portions 124 is formed on the central disc portion 105 at an outer circumferentially thereof. The tangentially extending recess-like cutout portions 124 are formed on the outer circumferentially of the central disc portion 105 in radially-inward areas of the fan blades 110 at root portions of the fan base portions 120, respectively, with a view to alleviating stress occurring during the rotation of the rotor 100 and when cutting the central disc portion 105 to form the fan blades 110.

Next, a method of forming the cutout portions 124 will be described below in detail.

FIG. 3 is a fragmentary enlarged view showing a part of the cooling fan 10.

As shown in FIG. 3, the central disc portion 105 has the outer circumferential periphery formed with the cutout portions 124 to be parts of the respective fan base portions 120 at positions radially inward of the fan blades 110, respectively. Each of the cutout portions 124 extends in a direction perpendicular to an assist line P in radially alignment with a radially extending wall 33a of each claw-like magnetic pole finger 33 associated with the fan base portion 120A contiguous with the cutout portion 124. While a part of the cutout portion 124 is shown in FIG. 3 with reference to a particular placement layout (in orientation), it will be appreciated that the other cutout portions 124 have similar layouts in position.

The part of the fan blade 110, shown in FIG. 3, is partially associated with one claw-like magnetic pole finger 33. That is, the fan blade 110 has one partial area axially lying on the axially outward end face 3a at a position corresponding to the claw-like magnetic pole finger 33 and the other remaining area axially dislocated from the axially outward end face 3a. Further, the fan base 120A, contiguous with the fan blade 110 in a circumferential direction as shown in FIG. 3, is associated with adjacent two claw-like magnetic pole fingers 33. In other words, the fan base portion 120A straddles the adjacent two claw-like magnetic pole fingers 33. Also, the fan base portion 120A is not fixedly attached to one of the claw-like magnetic pole fingers 33 but fixedly attached to the other of the claw-like magnetic pole fingers 33 by welding at two welded portions 122a and 122b.

There is a tendency in that the fan blade, fixedly attached in such a structure, has a lower fixing strength than that of the fan blade with a whole of the same being fully placed on the axially outward end face of a single claw-like magnetic pole finger. With the present embodiment, the cutout portion 124, associated with such a fan blade 110, has a length equivalent to a value of 2.2r or less wherein "r" represents a radius of a curved portion formed at the root portion 110a of the fan blade 110.

Figure 4:
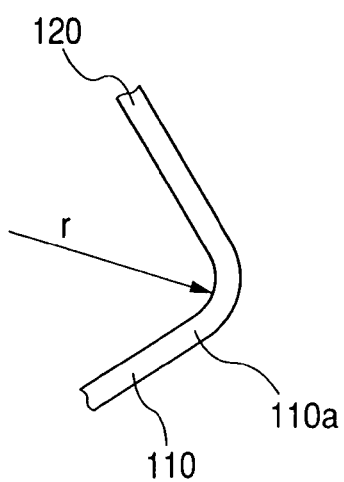
FIG. 4 is an enlarged fragmentary view taken on line IV-IV of FIG. 3.

FIG. 4 is a fragmentary enlarged cross-sectional view taken on line IV-IV of FIG. 3. As shown in FIG. 4, the fan blade 110 stands upright from the fan base so as to have the root portion 110a curved in the R"-shape (i.e., a round shape). Assuming the "R"-shape has the radius of "r", the length "a" of each cutout portion 124, shown in FIG. 3, is set to be 2.2r or less.

Figure 5:
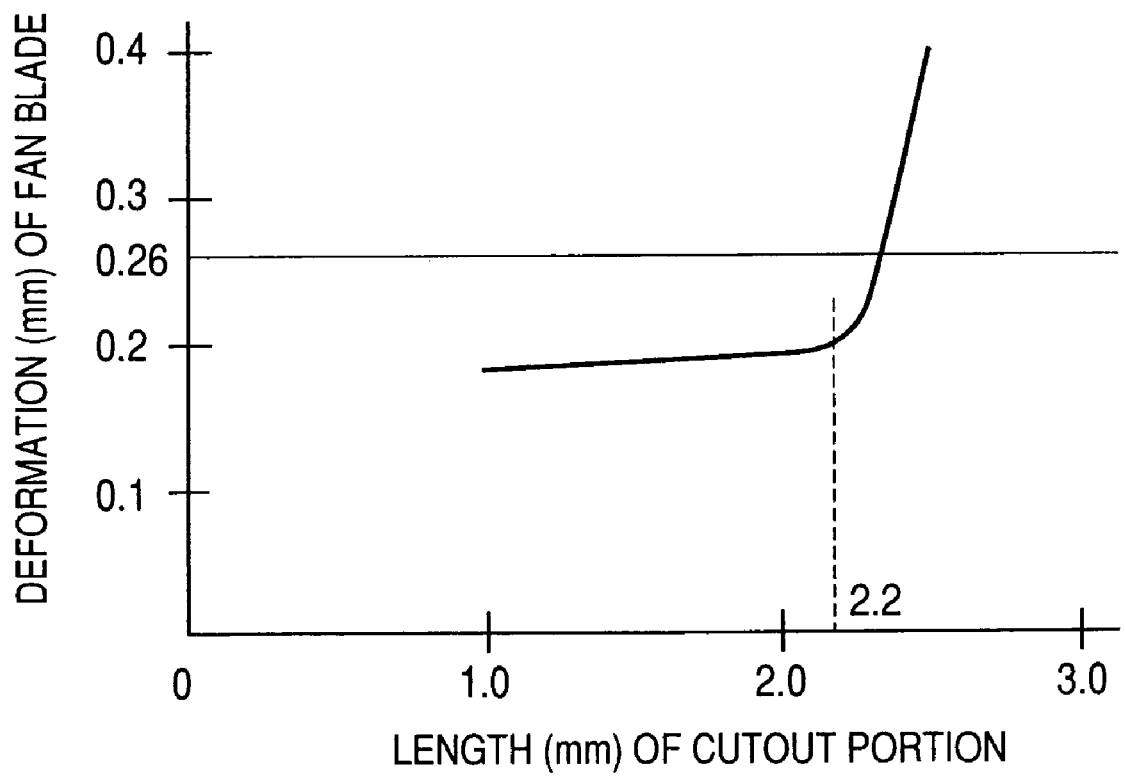
FIG. 5 is a graph showing the relationship between a length of a cutout portion and a deformation of a fan blade.

FIG. 5 is a graph illustrating the relationship between the length of the cutout portion 124 and a deformation of the fan blade 110.

In FIG. 5, "CUTOUT LENGTH", plotted on the abscissa axis, represents the length of the cutout portion 124 and "DEFORMATION (mm) OF FAN BLADE", plotted on the ordinate axis, represents a rate of causing the fan blade 110 to expand in a radial direction at the outermost diametric portion when the fan blade 110 is warped due to a centrifugal force. FIG. 5 shows a result obtained by checking the amount of deformation actually occurring on the fan blade 110 with the cutout portion being formed in varying lengths. Also, the "R"-shape of the fan blade 110 curved at the root portion 110a thereof has the value "r" falling in a value of 1 mm. In general, further, if the radius "r" of the "R"-shape of the root portion 110a is not greater than a dimension of a plate thickness, then a defect such as cracking or the like occurs during a press-bending operation. Therefore, the radius "r" may preferably have a lower limit value that can be automatically determined depending on the plate thickness.

As shown in FIG. 5, if the cutout portion 124 has the length of 2.2 mm or less, that is, a value of 2.2r or less, then the fan blade 110 has a smaller degree of deformation. However, if the length of the cutout portion 124 exceeds such a value, the fan blade 110 has an increasing degree of deformation. With the present embodiment, accordingly, the cutout portion 124 is determined to have the length of 2.2 mm or less. In addition, the deformation of the fan blade 110 is set to fall in an allowable limit value (a value in which the fan blade 110 is held in contact with the rotor) falling in a value of, for instance, 0.26 mm while having the cutout portion 124 with the length set to a value of 2.2r or less. This enables the fan blade 110 to have the deformation to be remarkably less than the allowable lower limit value.

With the present embodiment shown in FIG. 3, further, the fan base 120A, circumferentially contiguous with the fan blade 110, is associated with the two adjacent claw-like magnetic pole fingers 33. That is, the fan base 120A axially overlaps the axially outward end face 3a of the rotor 100 so as to straddle the two adjacent claw-like magnetic pole fingers 33. Also, the fan base 120A has a mounting portion 120Aa, fixedly connected to one of the two adjacent claw-like magnetic pole fingers 33 at the welded portions 122a and 122b by welding, and a blade supporting portion 120Ab that is not connected to the other of the two adjacent claw-like magnetic pole fingers 33. While the present embodiment has been described above with reference to the cutout portion 124 associated with one fan blade 110 shown in FIG. 3, the cutout portion 124 associated with the other fan blade 110 may have a length determined to have a value of 2.2r or less.

With the rotor 100 of the present embodiment set forth above, the cutout portion 124 is oriented to be perpendicular to the claw-like magnetic pole finger 33 extending in the radial direction. This enables a whole of the cutout portion 124 to bear stress occurring when the fan blade 110 is caused to deform due to the centrifugal force. This prevents stress from concentrating only at an end of the cutout portion 124, thereby enabling the cooling fan 10 to have increased strength. In addition, no need arises to decrease a size of the cooling fan 10 for the purpose of ensuring strength thereof, enabling the prevention of a drop in cooling capacity.

Further, under a circumstance where only a part of the fan blade 110 is associated with the claw-like magnetic pole finger 33 or under a circumstance where the fan base, associated with the fan blade 110, straddles the two claw-like magnetic pole fingers 33, there is concern that a drop occurs in strength if the fan base, straddling the two claw-like magnetic pole fingers 33, is fixedly connected to only one of the claw-like magnetic pole fingers 33. Even under such circumstances, forming the cutout portion 124 with a length of a given value (of 2.2r) or less results in a capability of suppressing the drop in strength to minimize the deformation of the fan blade 110 due to the centrifugal force to a value below an allowable value.

Furthermore, while the present invention has been described in detail with reference to the specific embodiment, it will be appreciated by those skilled in the art that the present invention is not limited to the present embodiment of such a structure and various modifications and alternatives to those details could be developed in light of the overall teachings of the disclosure. Accordingly, the particular arrangement disclosed is meant to be illustrative only and not limited to the scope of the present invention. With the rotor 100 of the present embodiment, for instance, the cutout portion 124 is located in an orientation perpendicular to the direction in which the claw-like magnetic pole finger 33 is oriented in the radial direction and the cutout portion 124 has the length determined to fall in the value of 2.2r or less. These two conditions may be preferably implemented at the same time or only one of these conditions may be implemented.

Moreover, while the embodiment of the present invention has been described above with reference to the rear (rear) cooling fan 10, the present invention can be applied also to the first (front) cooling fan 9.

While the present embodiment has been described above with reference to the cooling fan 10 having the fan blades 110 placed at unequal angular intervals, the present invention can be applied also to a cooling fan having fan blades placed at circumferentially equidistantly spaced intervals.

Further, although the present embodiment is concerned on a situation under which the rear cooling fan 10 is fixedly attached to the magnetic pole piece 3 by welding, other fixing means than welding may be employed. For instance, the magnetic pole piece 3 has areas, corresponding to the welded portions, which are formed with through-bores to which screws are tightened to fixedly support the cooling fan 10 on the magnetic pole piece 3.

What is claimed is:

1. A vehicle alternator rotor, the rotor having an axis of rotation and comprising:
    a pair of magnetic pole pieces, each having a plurality of claw-like magnetic pole fingers, each claw-like magnetic pole finger being oriented in a radial direction with the claw-like magnetic pole fingers of the pair of magnetic pole pieces alternately intermeshed with the claw-like magnetic pole fingers of the other pole piece of the pair of magnetic pole pieces;
    a field coil wound on boss portions of the magnetic pole pieces; and
    a pair of cooling fans fixedly mounted on the magnetic pole pieces, respectively;
    wherein each of the cooling fans includes a central disc portion, a plurality of fan base portions formed on the central disc portion at circumferentially spaced intervals, and a plurality of axially outward extending fan blades standing upright from the fan base portions in an axially outward direction, respectively;
    the central disc portion has an outer circumferential periphery formed with a plurality of cutout portions to be contiguous with roots of the fan base portions, respectively, and placed in areas radially inward of the fan blades, respectively;
    each of the cutout portions extends in a direction perpendicular to the radial direction on which each claw-like magnetic pole finger is oriented; and
    each of the fan blades has a root portion having a curved shape with a given radius and having a length of a value 2.2r or less where "r" represents a given radius of the curved shape.

2. The rotor as recited in claim 1, wherein:
    each of the fan base portions, circumferentially contiguous with the fan blade partially associated with the claw-like magnetic pole finger, is associated with the two adjacent claw-like magnetic pole fingers.

3. A vehicle alternator rotor, the rotor having an axis of rotation and comprising:
    a pair of magnetic pole pieces, each having a plurality of claw-like magnetic pole fingers, each claw-like magnetic pole finger being oriented in a radial direction with the claw-like magnetic pole fingers of the pair of magnetic pole pieces alternately intermeshed with the claw-like magnetic pole fingers of the other pole piece of the pair of magnetic pole pieces;
    a field coil wound on boss portions of the magnetic pole pieces; and
    a pair of cooling fans fixedly mounted on the magnetic pole pieces, respectively;
    wherein each of the cooling fans includes a central disc portion, a plurality of fan base portions formed on the central disc portion at circumferentially spaced intervals, and a plurality of axially outward extending fan blades, standing upright from the fan base portions in an axially outward direction, respectively, which have root portions curved from the fan base portions, respectively, each with a given radius;
    the central disc portion has an outer circumferential periphery formed with a plurality of cutout portions to be contiguous with roots of the fan base portions, respectively, and placed in areas radially inward of the fan blades, respectively; and
    each of the cutout portions extends in a direction perpendicular to the radial direction on which each claw-like magnetic pole finger is oriented, and has a length of a value 2.2r or less where "r" represents the given radius.

* * * * *